(12) United States Patent
Fan

(10) Patent No.: US 12,494,272 B2
(45) Date of Patent: Dec. 9, 2025

(54) INTELLIGENT METHOD AND INTELLIGENT SYSTEM FOR PROCESSING PHYSIOLOGICAL DATA

(71) Applicant: Hao-Yi Fan, Taipei (TW)

(72) Inventor: Hao-Yi Fan, Taipei (TW)

( * ) Notice: Subject to any disclaimer, the term of this patent is extended or adjusted under 35 U.S.C. 154(b) by 977 days.

(21) Appl. No.: 17/183,346

(22) Filed: Feb. 24, 2021

(65) Prior Publication Data

US 2021/0174920 A1    Jun. 10, 2021

Related U.S. Application Data

(63) Continuation of application No. PCT/CN2019/102327, filed on Aug. 23, 2019.
(Continued)

(51) Int. Cl.
*G16H 10/60* (2018.01)
*A61B 5/00* (2006.01)
(Continued)

(52) U.S. Cl.
CPC ........... *G16H 10/60* (2018.01); *A61B 5/0022* (2013.01); *A61B 5/7246* (2013.01);
(Continued)

(58) Field of Classification Search
CPC ........ G16H 10/60; G16H 40/67; G16H 50/70; G16H 50/20; G16H 40/20; G06N 20/00;
(Continued)

(56) References Cited

U.S. PATENT DOCUMENTS

| 10,909,830 B1 * | 2/2021 | Stapleford | H04W 4/90 |
| 11,648,373 B2 * | 5/2023 | Shouldice | A61B 5/486 |
| | | | 600/26 |

(Continued)

FOREIGN PATENT DOCUMENTS

| CA | 2997552 C * | 3/2020 | A61B 1/227 |
| CA | 2937972 C * | 4/2022 | A61B 5/7275 |

(Continued)

OTHER PUBLICATIONS

WIPO, International Search Report issued on Feb. 27, 2020.

*Primary Examiner* — Marc Q Jimenez
*Assistant Examiner* — Rachael Sojin Stone
(74) *Attorney, Agent, or Firm* — Li & Cai Intellectual Property Office

(57) ABSTRACT

An intelligent method and an intelligent system for processing physiological data are provided. The method is operated in a cloud system for implementing a health cloud. A database of the intelligent system stores personalized physiological data collected from various user-end devices, and physiological data transmitted from various medical data sources. A big data is therefore formed. The intelligent system receives continuous physiological data and non-continuous physiological data from each of the user-end devices by a communication circuit. The intelligent system performs big-data analysis to establish a physiological prediction model for predicting various physiological states, and therefore determines a physiological status according to the continuous physiological data or the non-continuous physiological data transmitted from each of the user-end devices. A feedback message is accordingly created and sent to a user in real time.

8 Claims, 9 Drawing Sheets

Related U.S. Application Data

(60) Provisional application No. 62/722,589, filed on Aug. 24, 2018.

(51) Int. Cl.

| | | |
|---|---|---|
| *G06F 16/28* | (2019.01) | |
| *G06N 20/00* | (2019.01) | |
| *G16H 40/20* | (2018.01) | |
| *G16H 40/67* | (2018.01) | |
| *G16H 50/20* | (2018.01) | |
| *G16H 50/70* | (2018.01) | |
| *H04L 67/1097* | (2022.01) | |
| *H04L 67/12* | (2022.01) | |

(52) U.S. Cl.
CPC .......... *A61B 5/7267* (2013.01); *A61B 5/7275* (2013.01); *G06F 16/283* (2019.01); *G06N 20/00* (2019.01); *G16H 40/67* (2018.01); *G16H 50/20* (2018.01); *G16H 50/70* (2018.01); *H04L 67/1097* (2013.01); *G16H 40/20* (2018.01); *H04L 67/12* (2013.01)

(58) Field of Classification Search
CPC ... G06F 16/283; A61B 5/0022; A61B 5/7246; A61B 5/7267; A61B 5/7275; H04L 67/1097; H04L 67/12
USPC .............................................................. 705/3
See application file for complete search history.

(56) References Cited

U.S. PATENT DOCUMENTS

| | | |
|---|---|---|
| 2007/0004969 A1 | 1/2007 | Kong et al. |
| 2011/0004110 A1 | 1/2011 | Shusterman |
| 2016/0051150 A1 | 2/2016 | Aarts |
| 2017/0055911 A1 | 3/2017 | Wijayaratna et al. |
| 2017/0305434 A1* | 10/2017 | Ratnasingam ........ B60W 50/14 |
| 2017/0347895 A1 | 12/2017 | Wei et al. |
| 2018/0137247 A1* | 5/2018 | Bore ...................... G16H 80/00 |
| 2023/0377709 A1* | 11/2023 | Shelton, IV ........... G16H 40/20 |
| 2024/0203581 A1* | 6/2024 | Juergens ................ G16H 40/40 |
| 2025/0009237 A1* | 1/2025 | Russek-Sobol ....... A61B 5/1112 |

FOREIGN PATENT DOCUMENTS

| | | |
|---|---|---|
| CN | 101504696 A | 8/2009 |
| CN | 102043894 A | 5/2011 |
| CN | 103778312 A | 5/2014 |
| CN | 104523263 A | 4/2015 |
| CN | 104796485 A | 7/2015 |
| CN | 104873186 A | 9/2015 |
| CN | 105078445 A | 11/2015 |
| CN | 105125221 A | 12/2015 |
| CN | 105160175 A | 12/2015 |
| CN | 106295986 A | 1/2017 |
| CN | 104523263 B | 6/2017 |
| CN | 107194191 A | 9/2017 |
| CN | 107529645 A | 1/2018 |
| CN | 107833635 A | 3/2018 |
| CN | 108289616 A | 7/2018 |
| CN | 105078445 B | 11/2018 |
| JP | 2006122610 A | 5/2006 |
| JP | 2018500949 A | 1/2018 |

* cited by examiner

INTELLIGENT METHOD AND INTELLIGENT SYSTEM FOR PROCESSING PHYSIOLOGICAL DATA

CROSS-REFERENCE TO RELATED PATENT APPLICATION

This application is a continuation application of International Patent Application No. PCT/CN2019/102327, with an international filing date of Aug. 23, 2019, which claims priority to the U.S. Provisional Patent Application Ser. No. 62/722,589 filed on Aug. 24, 2018, and which is incorporated by reference herein in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure is related to a method for processing physiological data, and more particularly to an intelligent method for processing physiological data and a system, in which big data analysis is performed based on physiological data transmitted from a user-end device and a physiological state is predicted via an artificial intelligence process.

BACKGROUND OF THE DISCLOSURE

A conventional health care system generally utilizes a physiological sensor worn by a care recipient or physiological sensors placed around the care recipient to analyze a physiological state thereof, and the physiological sensors are linked to a care center via a network. Whether or not the conventional health care system can actually achieve the purpose of caring for the care recipient depends on the sufficiency of physiological data provided by the physiological sensors at the end of the care recipient and an ability of the care center to provide an instant analysis.

Nevertheless, the current physiological sensors which are often worn by the care recipients can only provide limited physiological information, such as a basal heart rate or a heart rate variability provided by a heart rate sensor, a body temperature provided by a temperature sensor, and some detection data associated with sleeping, breathing or falling. Without adequate data like a 12-lead electrocardiogram created by a simulation process, it is difficult to make a complete and accurate preventive determination based on such limited physiological information.

Apart from the physiological data collected, past medical records of the care recipient and present environmental factors are also required to make a comprehensive determination, so as to arrive at an accurate determination of the physiological state. However, the conventional health care system cannot effectively achieve the comprehensive determination without a professional physician's determination and real-time assistance.

SUMMARY OF THE DISCLOSURE

The present disclosure is related to an intelligent system for processing physiological data and a method that can be operated in a cloud system. In the cloud system, an artificial intelligence algorithm and a machine-learning method are performed for implementing a health cloud. The health cloud performs learning upon multiple models of the system, so as to make prediction according to a physiological prediction model and provide users information of their physiological state.

According to one embodiment of the disclosure, the intelligent system for processing physiological data includes a database used to store personalized physiological data collected by various user-end devices and non-personalized physiological data transmitted from various medical information sources, so as to form a big data. A means for data collection is used to receive continuous physiological data transmitted from at least two user-end devices, non-continuous physiological data generated by each of the user-end devices which are activated by a user, and/or non-continuous physiological data generated by the at least two user-end devices which are activated by the cloud system. The continuous and the non-continuous physiological data forms a part of the big data stored in the database.

The intelligent system for processing physiological data performs various functions by software. One of the functions performed by the intelligent system is means for machine-learning that can perform analysis upon the big data stored in the database, so as to establish a physiological prediction model for predicting various physiological states. Means for predicting physiological state is performed according to the physiological prediction model based on the physiological data transmitted from the user-end device. Further, means for analysis is provided in the system for analyzing the continuous physiological data and/or the non-continuous physiological data transmitted from the at least two user-end devices. After an analysis and a comparison with the physiological prediction model, a physiological state can be determined. A means for feedback is used to generate a feedback message with respect to the continuous physiological data or the non-continuous physiological data according to the physiological state obtained by analyzing the continuous or non-continuous physiological data transmitted from the at least two user-end devices. The feedback message is transmitted back to a communication device of the user according to identification and communication information of each of the user-end devices.

Further, the user-end device worn by the user includes a first user-end device, such as a smart bracelet, smart necklace, smart clothes or various fixed physiological sensing devices that are signally connected to the user. The first user-end device receives the physiological data with a minority of items, so as to form the continuous physiological data that can be transmitted to the cloud system.

Further, the user can activate the first user-end device actively for receiving the physiological data with a minority of items within a period of time, so as to form the non-continuous physiological data that can be transmitted to the cloud system.

Furthermore, the user-end device worn by the user includes a second user-end device. When the means for feedback generates the feedback message that is transmitted to the communication device with respect to the continuous physiological data or the non-continuous physiological data, the second user-end device is activated to generate the physiological data instantly or for a period of time, and the physiological data is transmitted to the cloud system.

Further, the means for analysis can be implemented by an artificial intelligence technology that determines one of the physiological states according to various preset physiological states of the physiological prediction model based on continuous physiological data or the non-continuous physiological data transmitted by the user-end devices.

Preferably, the system provides a prediction mode that utilizes the big data collected in a database through a machine-learning method, so as to obtain the physiological prediction model for predicting the various physiological states. The physiological prediction model is optimized by referring to the user's state corresponding to each piece of the non-continuous physiological data.

Further, the system provides a learning mode that is used to comprehensively determine the various physiological states based on the physiological data generated by both the first user-end device and the second user-end device as compared with the physiological prediction model established through the machine-learning method in the cloud system. The physiological prediction model can therefore be further optimized.

According to embodiments of the intelligent method for processing physiological data, the user-end device worn by the user receives the continuous physiological data or the non-continuous physiological data, which are analyzed and compared with the physiological prediction model established by the machine-learning method in the cloud system, so as to determine a physiological state. A feedback message corresponding to the continuous physiological data is generated based on the physiological state obtained by analyzing the continuous physiological data or the non-continuous physiological data. The feedback message is then transmitted to a communication device via a communication network according to the identification and communication information of the user-end device.

The database is included in the cloud system, and the database is used to store personalized physiological data collected by the various user-end devices and de-identified non-personalized physiological data transmitted from the various medical information sources, so as to form a big data. Through the means for machine-learning and big-data analysis, the system can establish a physiological prediction model which is used to predict various physiological states.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
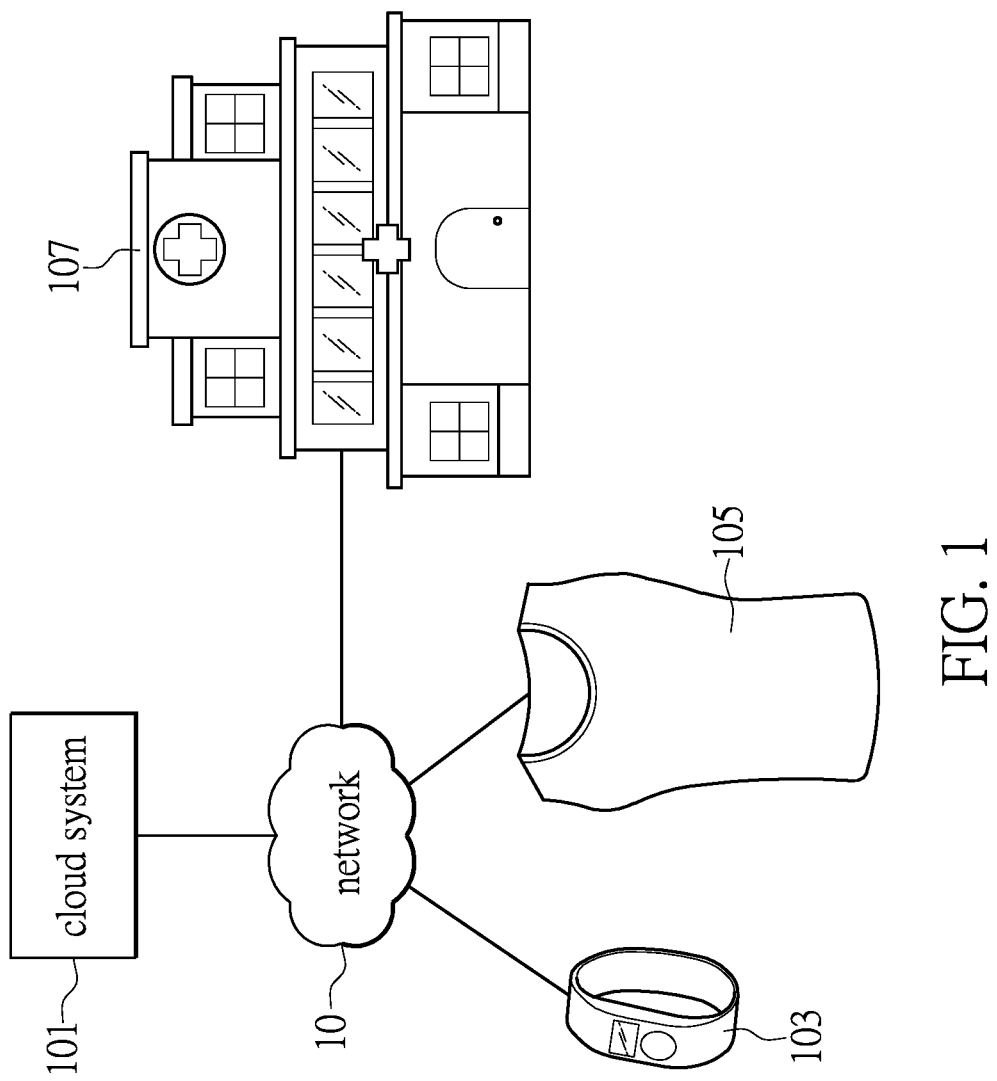
FIG. 1 is a schematic diagram depicting a system framework operating an intelligent method for processing physiological data according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure is related to an intelligent method for processing physiological data and a system thereof. The method provides a solution that can effectively process the physiological data generated by a user-end device. The system operating the intelligent method adopts cloud computation and communication technologies that are based on a big data analysis technology. The big data includes a comprehensive and complete data retrieved from various medical institutions or medical centers. Accordingly, the method can generate various physiological prediction models by learning the physiological data via an artificial intelligence technology. The physiological data is retrieved from the user-end device, such as a smart bracelet, a smart necklace, smart clothes worn by a user or a fixed sensor connected to the user. Even though the physiological data generated by the user-end device is generally limited and unilateral, the intelligent method can still correctly interpret the physiological data through the physiological prediction model in a cloud system, so that an accurate physiological state can be fed back to the user.

It should be noted that by various machine-learning methods and big data analysis, the artificial intelligence technology operated in the system can obtain strong correlations between the input and output data based on a large amount of physiological data collected from the various user-end devices. The physiological data can be the complete physiological data of a medical institution or a health center. The physiological prediction model can be generated by software technology. The physiological prediction model records various physiological characteristics under various physiological states.

The mentioned data is collected from the physiological sensing device worn by a user or the data obtained from an environmental sensing device. The physiological prediction model can be optimized according to the user's feedback. The physiological prediction model can be used to determine a current physiological state or predict a future physiological state accurately and effectively based on limited data.

Reference is made to FIG. 1, which depicts a framework of the system operating the method for processing physiological data according to one embodiment of the disclosure. The system provides a cloud system 101. The cloud system 101 implements a health cloud that is established based on the technologies such as big data analysis and artificial intelligence. The cloud system 101 connects with various medical information sources (such as a medical institution 107) or various user-end devices (such as a smart bracelet 103 or smart clothes 105) via a requisite network device and a network 10.

The cloud system 101 receives the physiological data from at least two user-end devices, e.g., the smart bracelet 103 and the smart clothes 105, via the network 10. The user can connect to or wear one or more types of user-end devices. The user-end device is generally a wearable device or a fixed physiological sensing device that is signally connected to the user. The user-end device that is equipped with a networking circuit can be directly connected to the cloud system 101. Alternatively, the user-end device can be connected to the cloud system 101 via a network device installed at the place where the user is or via a personal smart device.

According to one embodiment of the disclosure, the intelligent system for processing physiological data collects the physiological data through the intelligent method for processing physiological data operated in the cloud system 10. In the intelligent method, the physiological data are, for example but not limited to, generated by the user-end devices and a medical information source, e.g., the medical institution 107. In general, the physiological data generated by the medical institution 107 is more comprehensive data that covers the data generated by a variety of physiological sensing devices and the de-identification personalized data. The personalized data is, for example, a user's instant physiological data and his medical historical data. The de-identification non-personalized data include the data of every gender, all age groups, all ethnic groups, various diseases and environmental information. The above-mentioned personalized and non-personalized physiological data form the big data required by the intelligent method for processing physiological data that is operated in the cloud system 101. After analyzing the big data, the physiological prediction model that is used to predict various physiological states is generated.

The cloud system 101 embodies a health cloud that obtains the more comprehensive physiological data from the medical institution 107 or the medical centers, and the limited physiological data received from the user-end devices (103, 105). The physiological data can be learned by an artificial intelligence (AI) machine-learning method in the health cloud, so as to enhance the data and extract meaningful information. The health cloud is provided for achieving the purpose of protecting a specific group.

The information obtained through the big data analysis can be used to train a physiological prediction model by a machine-learning technology for determining and predicting a physiological state. Through the physiological prediction model, the physiological information can be reasonably determined from the physiological data generated by the various user-end devices. Further, an underlying physiological state can also be determined from the present physiological data. The physiological prediction model also allows the system to predict the physical state of the user in the future.

An instant physiological state of a user includes heart rate, breathing, body temperature, blood pressure, or reaction to things, which can be combined to form a comprehensive physiological state. Further, a more complex factor that forms the physiological state may be an environmental state around the user. The environmental information may relate to temperature, humidity, climate, and/or air quality. Further, the user's physiological diseases and medical history can also be referred to for the system to predict the user's physiological state more comprehensively and completely. Still further, a data analysis can be performed upon an ethnic group, a race, a dwelling place, an age, and/or gender. The machine-learning method is used in the field of artificial intelligence (AI), and relies on a specific algorithm to analyze the data and learn features of the data. The physiological prediction model used to determine or predict the user's physiological state is established. Therefore, the cloud system 101 implements the health cloud through AI technologies, such as big data analysis and machine learning, so as to establish the physiological prediction model. Furthermore, the physiological prediction model can be optimized based on the new data and feedback information from time to time. In this embodiment, for example, a triggering action forms information that is used to optimize the model effectively.

Figure 2:
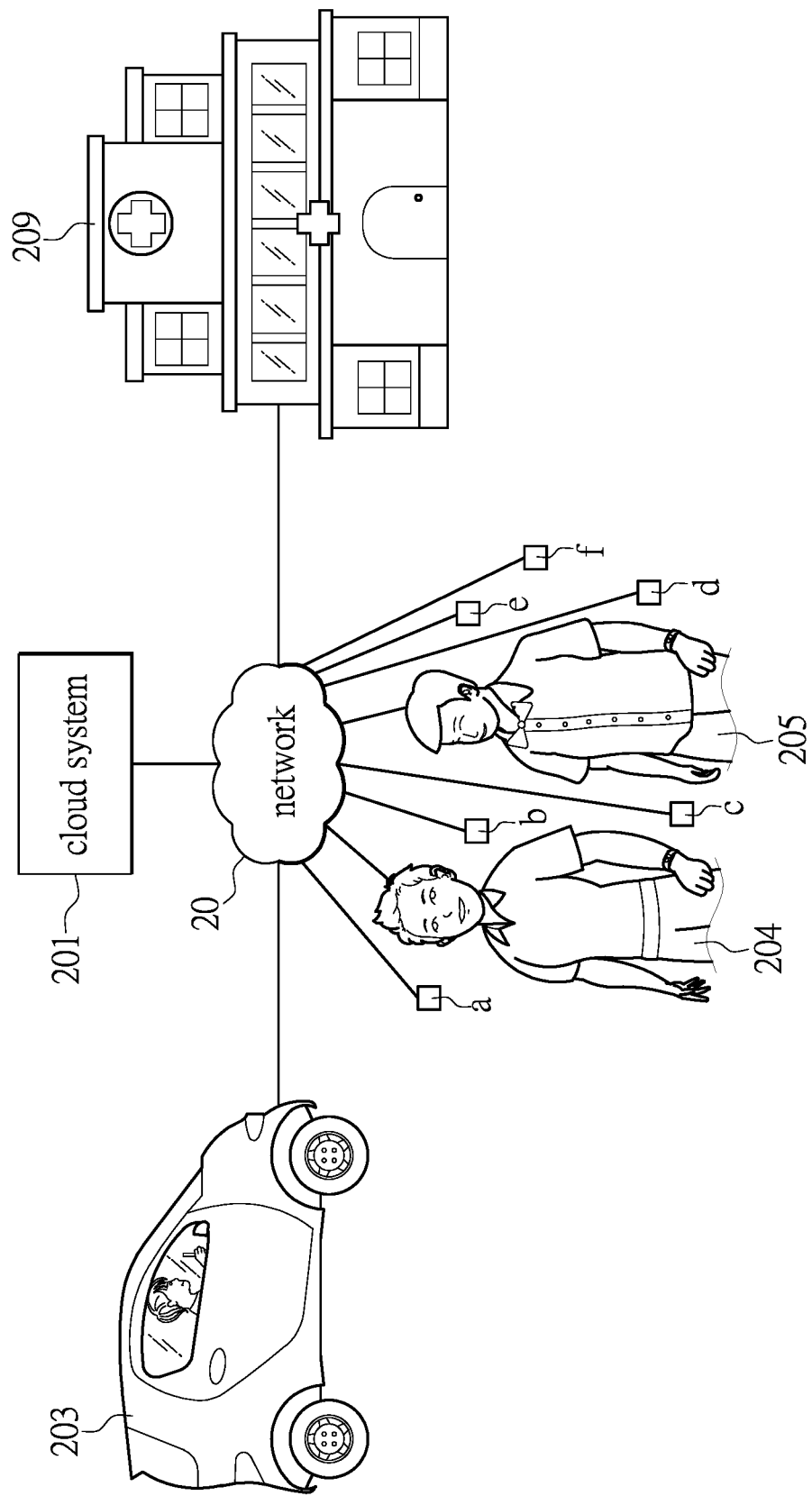
FIG. 2 is a schematic diagram depicting an intelligent system for processing physiological data according to one embodiment of the present disclosure.

FIG. 2 is another schematic diagram depicting the intelligent system for processing physiological data according to another embodiment of the present disclosure. A cloud system 201 not only collects the physiological data generated in a medical institution 209 and various user-end devices worn by users 204 and 205 via a network 20, but also the environmental information (other than the physiological data) sensed by a plurality of sensor devices a, b, c, d, e and f. The environmental information can be temperature, humidity, climate, air quality, pressure, time and light that may be combined for conducting a comprehensive determination in order to predict a physiological state accurately.

In particular, when the physiological data transmitted from the user-end device is used to determine or predict a possible situation, the environmental information is also an important clue to make the determination. As shown in the diagram, the data sensed by the sensor devices a, b, c, d e and f around the users 204 and 205 becomes important information for the cloud system 201 to determine an environmental state. For example, when the physiological data transmitted from the user-end device worn by the user to the cloud system 201 shows a state of abnormal heart rate, if there is a possibility for the environmental temperature and humidity to make the user feel uncomfortable, and the user has a medical history of heart disease, the system will take an appropriate preventive measure when compared with the physiological prediction model.

In the present example, a driver of a car 203 wears one or more user-end devices, such as a smart bracelet and/or smart clothes. The user-end devices can connect with the cloud system 201 via a network device. The cloud system 201 can receive the physiological data continuously. An artificial intelligence technology of the cloud system 201 can make prediction anytime based on the driver's age, medial history and/or information of his environment, or only based on the instant physiological data received from the user-end devices. The physiological state of the driver is especially related to driving safety. If the artificial intelligence technology of the cloud system 201 determines that the driver will have an abnormal physiological status presently or at a next moment, the driver or another related person may be notified by the system to prevent an unsafe condition or take an appropriate action.

In one further embodiment, the user-end device can be signally connected to a fixed physiological sensing device worn by the driver via a wire connection. For example, the user-end device can connect with a sensing device installed in the car 203 and in the physiological sensing device mounted on a steering wheel held by the driver.

If the driver wears two types of user-end devices, the cloud system 201 can firstly acquire the physiological data generated by a first user-end device depending on real situation. If the artificial intelligence technology of the cloud system 201 determines that there is a possibility of abnormality, the second user-end device can be activated according to a setting, and the cloud system 201 can then receive the physiological data generated by the second user-end device for obtaining a more accurate prediction result.

In one further embodiment of the present disclosure, the cloud system 201 can receive the physiological data generated by the user-end devices continuously, and the user-end devices can be actively activated by the driver to transmit the physiological data to the cloud system 201 when the driver feels any physical condition. Afterwards, the cloud system 201 determines whether or not there is any abnormal condition and takes an appropriate action.

Figure 3:
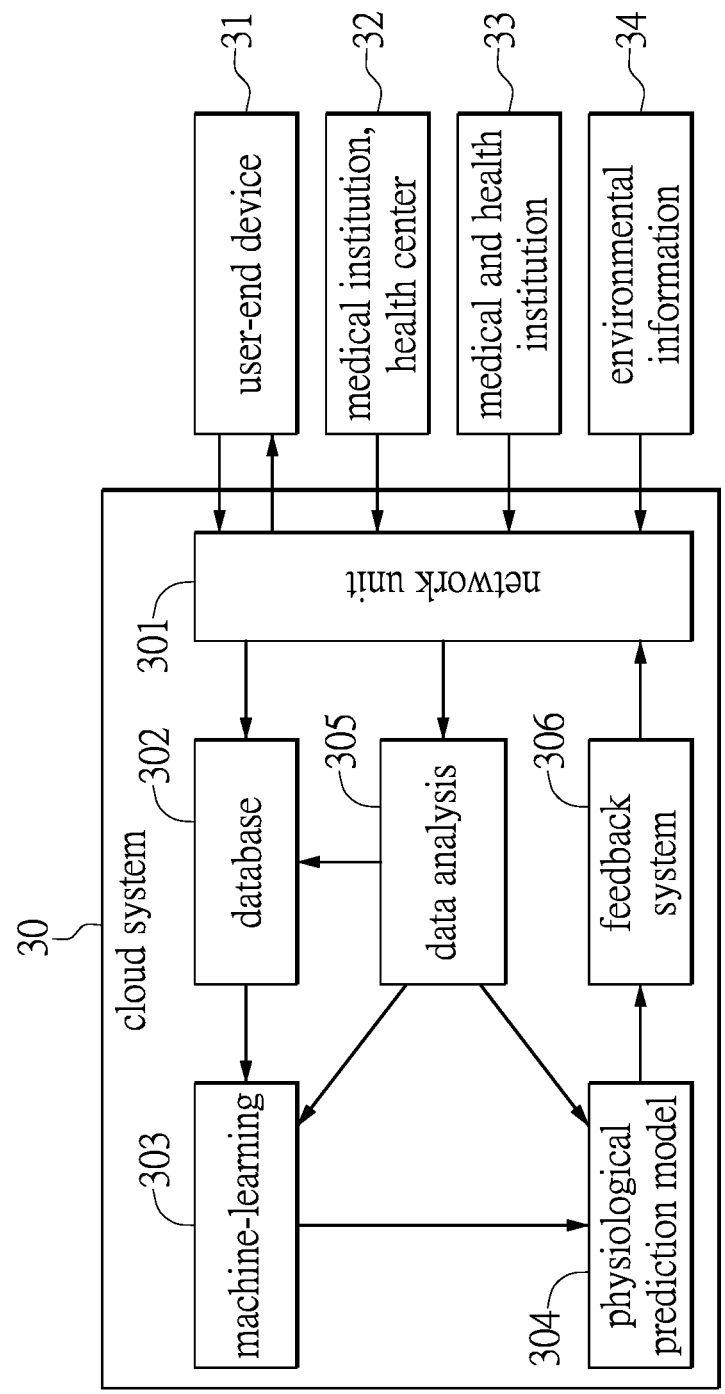
FIG. 3 is a block diagram depicting function modules of a cloud system operating the intelligent method for processing physiological data according to one embodiment of the present disclosure.

FIG. 3 is a block diagram depicting function modules of the cloud system that implements the intelligent method according to one embodiment of the present disclosure.

A cloud system 30 shown in the drawing can be implemented by a computer system that includes a processor, a memory, a communication circuit and a storage device. An intelligent method for processing the physiological data is performed in the computer system through software. The computer system embodies various functionalities, such as a machine-learning method 303, a physiological prediction model 304, a feedback system 306, and a data analysis 305. A database 302 is used to store the physiological data obtained from various sources and environmental data. The cloud system 30 connects with various data sources via a network unit 301. The data sources include various user-end devices 31, a medical organization 32 (such as one or more medical institutions and one or more health centers), and even a government organization (such as a medical and health institution 33). The medical organization 32 and the government organization can provide more comprehensive health data about citizens. The data sources also include various environmental sensing devices that can generate environmental information 34.

According to one of the embodiments of the present disclosure, the cloud system 30 provides various paths for collecting data. The network unit 301 of the system performs a means for data collection, which is used to receive continuous physiological data transmitted from at least two user-end devices 31 and non-continuous physiological data generated by each of the user-end devices 31 which are activated by a user. The continuous and non-continuous physiological data form a part of the big data stored in the database 302. It should be noted that the continuous physiological data includes the physiological data that the user-end device 31 continuously or periodically uploads to the cloud system 30. In one aspect, the user-end device 31 uses a storage device to store the physiological data sensed by the physiological sensing devices periodically, and these physiological data can be uploaded to the cloud system 30 periodically. In another aspect, if an analysis of the cloud system 30 determines that there is any physiological abnormality, the cloud system 30 can also require the user-end device 31 to upload the physiological data stored in the storage device according to a specific requirement.

The user-end device 31 can be many types. For example, the user-end device 31 can be a health bracelet, smart clothes or any user-end medical facility that may provide personalized physiological data. The medical organization 32 can be the medical institution and the health center shown in the drawing and is used for providing more complete physiological data. The personalized physiological data can be the de-identification personalized physiological data or the de-identification non-personalized physiological data. The medical and health institution 33 can be a health insurance agency that can provide personalized or non-personalized physiological data. The big data established in the database 302 of the cloud system 30 also includes the environmental information 34.

The big data in the database 302 can be analyzed through the machine-learning method 303 for establishing a physiological prediction model that is used to predict various types of physiological states. Further, a user's state being determined with respect to every non-continuous physiological data can be used to optimize the physiological prediction model. Furthermore, the physiological prediction model 304 can rely on the physiological data with a minority of states provided by the user-end device 31 to determine a physiological state as compared with the physiological prediction model corresponding to various preset physiological states. The physiological data with the minority of items can be the continuous physiological data or non-continuous physiological data generated by the user-end device 31. A means for analysis implemented by an artificial intelligence technology is used to determine a current physiological state or predict a future physiological state by referring to various data from various sources.

Next, the feedback system 306 generates a feedback message corresponding to the continuous physiological data or the non-continuously physiological data by analyzing the continuous physiological data or the non-continuous physiological data transmitted from the user-end device 31. In this way, relevant health information is formed, and an instant message is provided to the user. The feedback system 306 sends the feedback message to a user-end communication device according to identification and communication information corresponding to the user-end device 31 via a communication circuit, e.g., the network unit 301. The communication device can be a use-end smart device, or a device of a contact person who is listed on a contact list. The system provides an effective suggestion through the feedback message for protecting the user.

A function of the data analysis 305 is to process messages transmitted from various sources of physiological data. The function of the data analysis 305 mainly relies on the continuous physiological data or the non-continuous physiological data transmitted from the at least two user-end devices to determine a physiological state as compared with the physiological prediction model. For example, the user can actively activate the user-end device 31 worn on the user for obtaining physiological data that can be temporarily stored in the memory of the user-end device for a period of time. The cloud system 30 can accordingly obtain physiological data with the minority of items received from the user-end device 31 in that period of time. The physiological data collected within that period of time is the non-continuous physiological data that can be used to determine a specific physiological state after being processed by the data analysis 305, and forms a part of the big data in the database 302. Based on the non-continuous physiological data, the physiological prediction model 304 is incorporated to determine or predict one of the physiological states.

Figure 4:
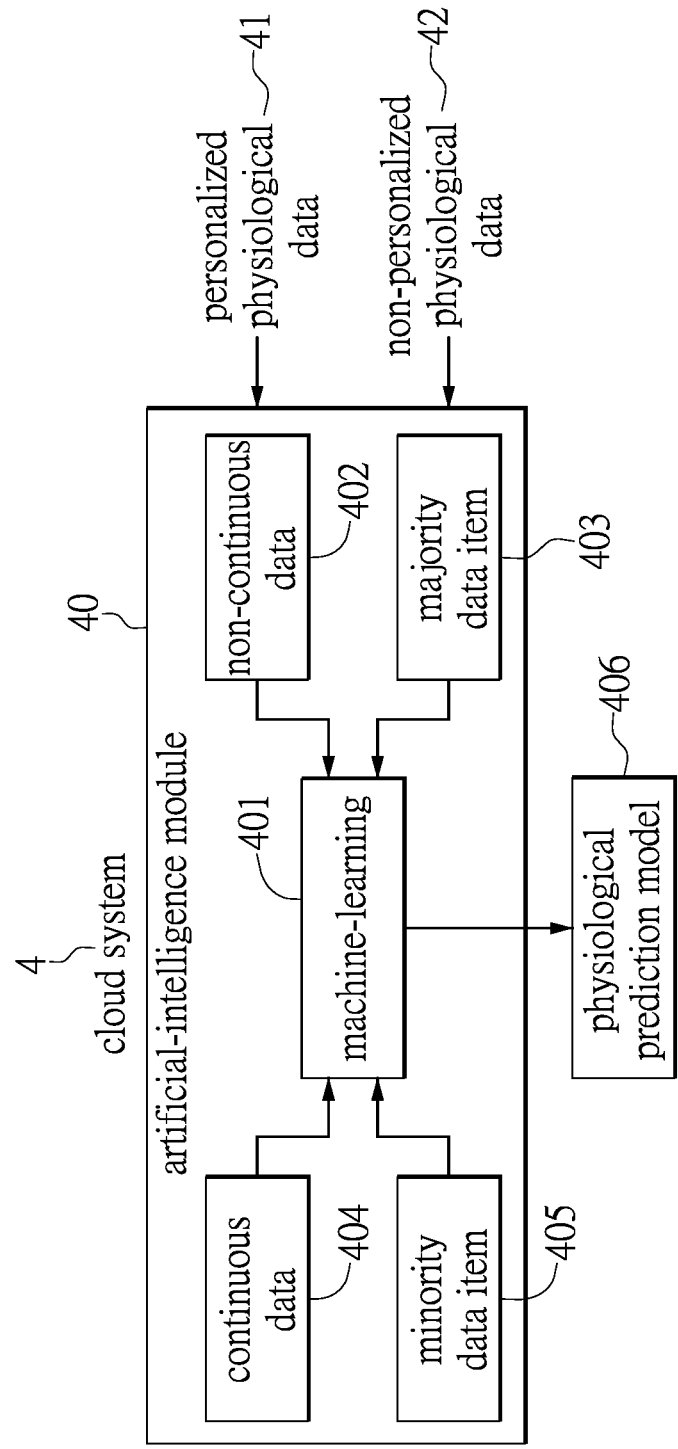
FIG. 4 is a block diagram depicting an artificial intelligence technology operated in the cloud system according to one embodiment of the present disclosure.

FIG. 4 is a schematic diagram depicting an artificial intelligence technology operated in the cloud system according to one embodiment of the present disclosure.

The cloud system 4 incorporates an artificial-intelligence module 40 that is based on a machine-learning method 401 for performing a big data analysis and a machine-learning procedure, and for conducting prediction through the physiological prediction model.

The cloud system 4 receives the personalized physiological data 41 and the non-personalized physiological data 42 from a user-end device or various medical information sources. The physiological data includes several characteristics that are related to the data to be provided by the user-end device, the medical institution or the health center and to be processed by the machine-learning method 401, so as to form a part of the big data.

A first type of data can be classified into non-continuous data 402 and continuous data 404.

The physiological data received by the cloud system 4 can be classified into the non-continuous data 402 and the continuous data 404. These two types of data are fed to the machine-learning method 401. The non-continuous data 402 is the data that every user-end device transmits and labels actively. For example, if the user who wears the user-end device feels uncomfortable, an emergency signal can be issued through a communication function of the device (such as an SOS button). The cloud system 4 can receive the data including a message with labeling reminder, time, identification and the related physiological data. For the system, the labeled physiological data reveals an obvious correlation among the data.

The non-continuous data 402 can be the labeled physiological data that is provided for the artificial-intelligence module 40 for data learning in the cloud system 4. Some specialized medical technicians cooperate with the machine-learning method 401 of artificial intelligence technology for identifying the physiological data. The system can therefore determine whether or not the current physiological state is different from an expected state. If the difference or variation reaches a meaningful abnormality, the cloud system 4 issues a signal to the user or a related person for further instruction and necessary treatment.

The continuous data 404 includes the physiological data unselectively collected from various medical institutes and the physiological data that is continuously generated by the user-end device. The continuous data 404 forms non-selective physiological information in a big data. The continuous data 404 is generally the non-selective data generated by a fully functional medical facility. The fully functional medial facility can be the medical equipment used to measure a patient's physiological data. For example, the medical equipment can be a device worn by the patient. The wearable device can continuously collect the physiological data and transmit the physiological data to the cloud system 4 via a specific network device. Further, software run in a specific computer device can be used to upload the physiological data to the cloud system 4 after filtering and sorting the data initially. In the process, the physiological data is continuously filtered and fed back to machine-learning method 401 for constituting a more complete health cloud.

It should be noted that the continuous data 404 retrieved by the medical institution includes the data that is filtered by a built-in filtering mechanism of a physiological monitoring facility in a ward. Therefore, the physiological monitoring facility with the built-in filtering mechanism can determine an abnormal event or an urgent risk and notify the medical staff in time. After that, a subsequent treatment or any urgent treatment can be performed. It should be noted that the wearable device cannot be compared to the facilities disposed in the ward or an intensive care unit since the wearable device can only provide limited physiological data that lacks completeness and stability. However, through the cloud system 4 cooperating with the wearable device and the machine-learning process, information equivalent to a majority of data obtained from continuous monitoring can be acquired.

In the cloud system 4, the artificial-intelligence module 40 may not transform the data into meaningful information right away. However, through the labeled non-continuous physiological data and a comparison with the results, the data that seems to have no obvious purpose becomes reliable, positive and effective information. Therefore, the user who provides the physiological data can be reminded right away if the user meets a similar condition next time. The system will remind the user to go to a hospital for seeking medical treatment or related treatments. Further, the system can forward the case to an authority for performing subsequent management and health care after authorization.

A second type of data is a combination of a minority of items 405 and a majority of items 403.

The wearable device can only sense partial physiological data since the wearable device is worn on a specific portion of the user. Therefore, the wearable device is a device used to collect physiological data with the minority of items 405, and the physiological data related to other portions of the user may be obtained by a simulation process. Alternatively, a plurality of wearable devices or test facilities can be disposed on multiple portions or many limbs for collecting relatively more comprehensive physiological data, i.e., physiological data of the majority of items 403.

The artificial-intelligence module 40 collects the physiological data with the minority of items 405 and compares the same with the physiological data of the majority of items 403, so as to improve and develop parameters applied to the device that is used to collect the minority of items 405 through simulation. Accordingly, the completeness provided by the device used to collect the majority of items 403 can be replaced.

Thus, the data processed in the artificial-intelligence module 40 at least includes the above-mentioned continuous data 404. The continuous data 404 is such as the physiological data that is continuously received from the user-end device worn by the user. The non-continuous data 402 is such as the physiological data that is generated by the user-end device when the user actively activates the user-end device to generate the physiological data for a period of time. The minority of items 405 indicates that only few items of physiological data generated by the user-end device can be obtained. The majority of items 403 indicate that relatively more items of physiological data generated by the wearable device or any testing device can be obtained.

Under a specific circumstance, the cloud system 4 determines an abnormal condition as compared with the physiological prediction model 406 after analyzing the continuous physiological data generated by the first user-end device. The user may be notified if the cloud system confirms the abnormal condition. A second user-end device can be actively driven or passively controlled to transmit the physiological data that is collected for a period of time. A physiological state can be accurately determined based on the physiological data. The physiological data can also be labeled for corresponding to the non-continuous data 402, i.e., the non-continuous physiological data. The continuous and non-continuous physiological data form the data for optimizing the physiological prediction model 406.

Further, in the big-data analysis technology, environmental data can also be included. The data collected by the cloud system 4 includes data collected from a personal device (e.g., a wearable device and a personal medical facility), public data (e.g., health data and insurance data), environmental data relating to region, climate and season, and real-time data. These data form the big data provided for the artificial-intelligence module 40. The machine-learning method 401 establishes the physiological prediction model 406 based on these data.

Figure 5:
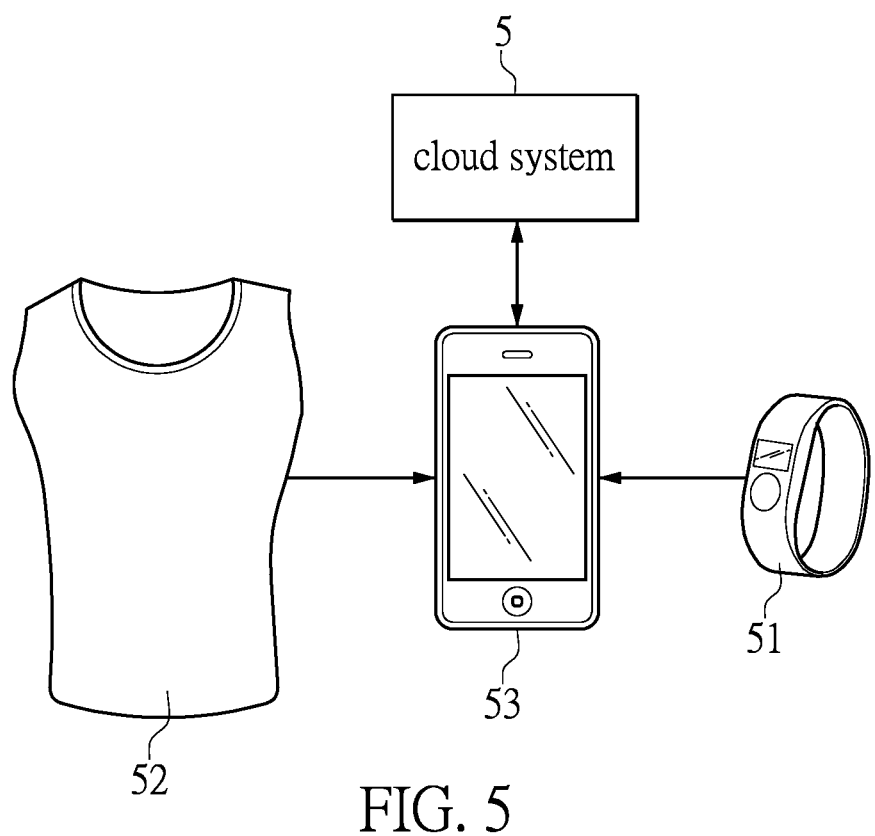
FIG. 5 is a schematic diagram depicting the intelligent system in one embodiment of the present disclosure.

Reference is made to FIG. 5, which is a schematic diagram depicting an intelligent system according to one embodiment of the present disclosure.

As shown in the drawing, a first user-end device 51 is such as a smart bracelet and a second user-end device 52 is such as smart clothes. The first user-end device 51 and the second user-end device 52 upload the physiological data to a cloud system 5 by connecting to a data input-output device, i.e., a personal smart device 53, that can be a smart phone, a tablet computer or a personal computer.

In one embodiment of the present disclosure, the user can actively activate the first user-end device 51 for obtaining a minority of items of physiological data for a period of time. The minority of items of physiological data form the non-continuous physiological data transmitted to the cloud system 5. Alternatively, the first user-end device 51 may continuously transmit the physiological data to the cloud system 5.

In the meantime, the cloud system 5 relies on the minority of items of physiological data to determine a current physiological state of the user based on the physiological prediction model. The means for feedback is used for transmitting a message about the physiological state to the personal smart device 53, e.g., a mobile phone. The message is about a feedback message with respect to the non-continuous physiological data. The feedback message may form a condition to activate the second user-end device 52 to provide the physiological data that can be generated instantly or for a period of time. The physiological data is transmitted to the cloud system 5. It should be noted that the physiological data generated while the second user-end device 52 is activated can be labeled in the cloud system 5 for a purpose of establishing a correlation with the non-continuous physiological data related to the feedback message.

One of the effects relating to the correlation made between the physiological data generated by the second user-end device 52 to be activated and the non-continuous physiological data relating to the minority of items of physiological data is that the cloud system 5 is allowed to confirm the user's physiological state via the at least two user-end devices. Therefore, a more accurate prediction can be provided. In one circumstance, when the artificial intelligence technology of the cloud system 5 relies on the physiological data transmitted from the first user-end device to determine any abnormality, the user is required to activate the second user-end device for providing further physiological data of other portions of the user. Accordingly, the accuracy of the prediction results can be mutually verified.

Figure 6:
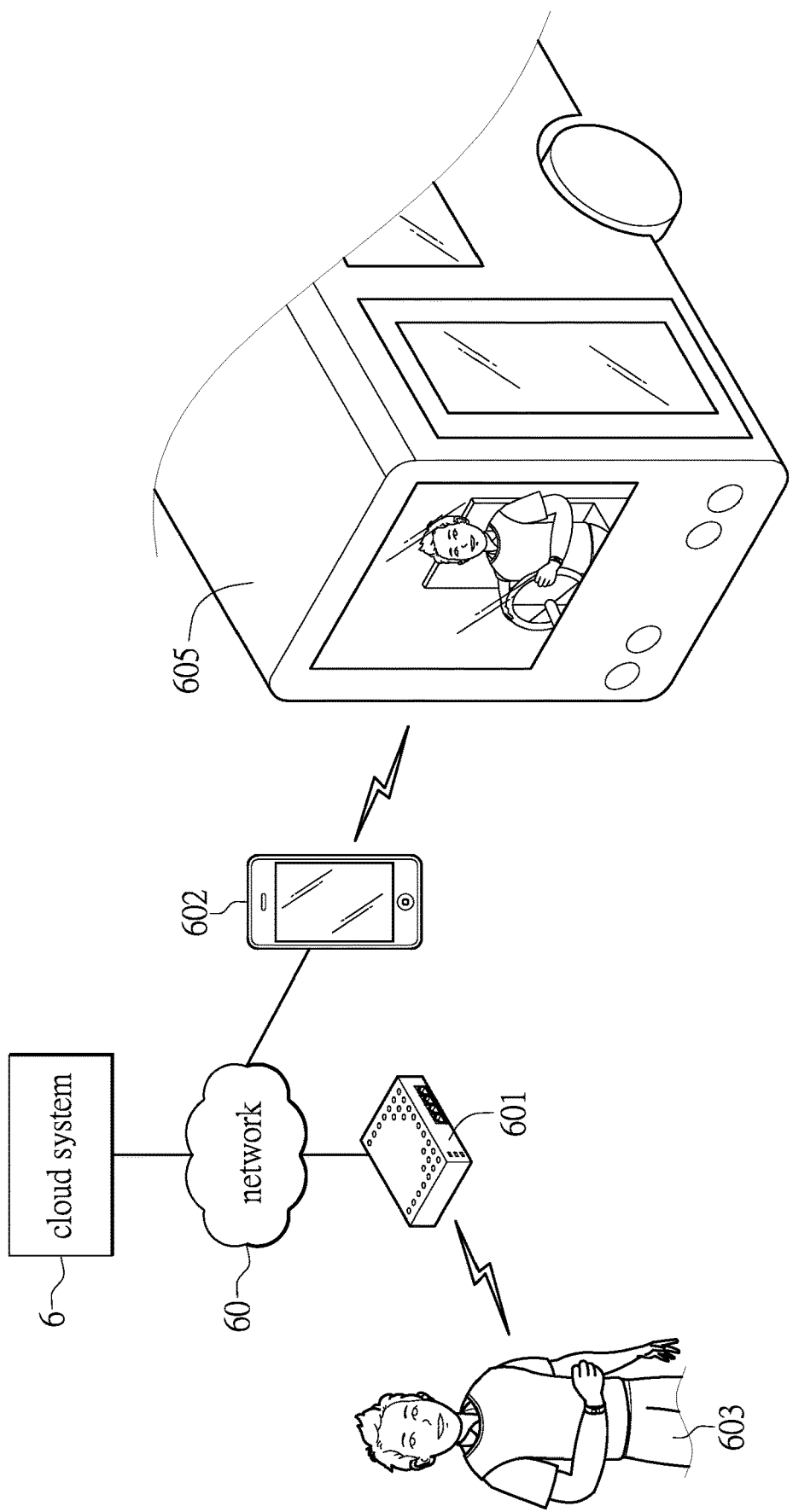
FIG. 6 is another schematic diagram depicting the intelligent system in one embodiment of the present disclosure.

Reference is made to FIG. 6, which is another schematic diagram depicting the intelligent system according to one embodiment of the present disclosure. A cloud system 6 is shown in the drawing. The cloud system 6 connects with various user-end devices via various connection methods. The present example shows that the cloud system 6 connects with the user-end devices via a network 60.

The user-end device can be a wearable device worn by a user 603. The user-end device can connect to the network 60 via a nearby network device 601. The cloud system 6 can obtain the continuous or non-continuous physiological data from the user-end device. In an exemplary example, a driver of a vehicle 605, e.g., a bus shown in the drawing, wears a specific user-end device that can connect to the network 60 via a personal smart device 602, and the user-end device can transmit the continuous or non-continuous physiological data to the cloud system 6.

In the present example, a care recipient is set to be the driver of a public transportation. The driver of the public transportation wears a health bracelet (i.e., a first user-end device) and also puts on smart clothes (i.e., a second user-end device) when he is going to work. Before the driver's departure, the user-end devices should be verified to function properly and send a correct message. When the driver is on duty, an application (i.e., APP) executed in a personal smart device 602 is used to collect physiological data generated by both the first user-end device and the second user-end device. The instant physiological data allows the cloud system 6 to monitor the physiological state of the driver of the vehicle 605 at any time.

Figure 7:
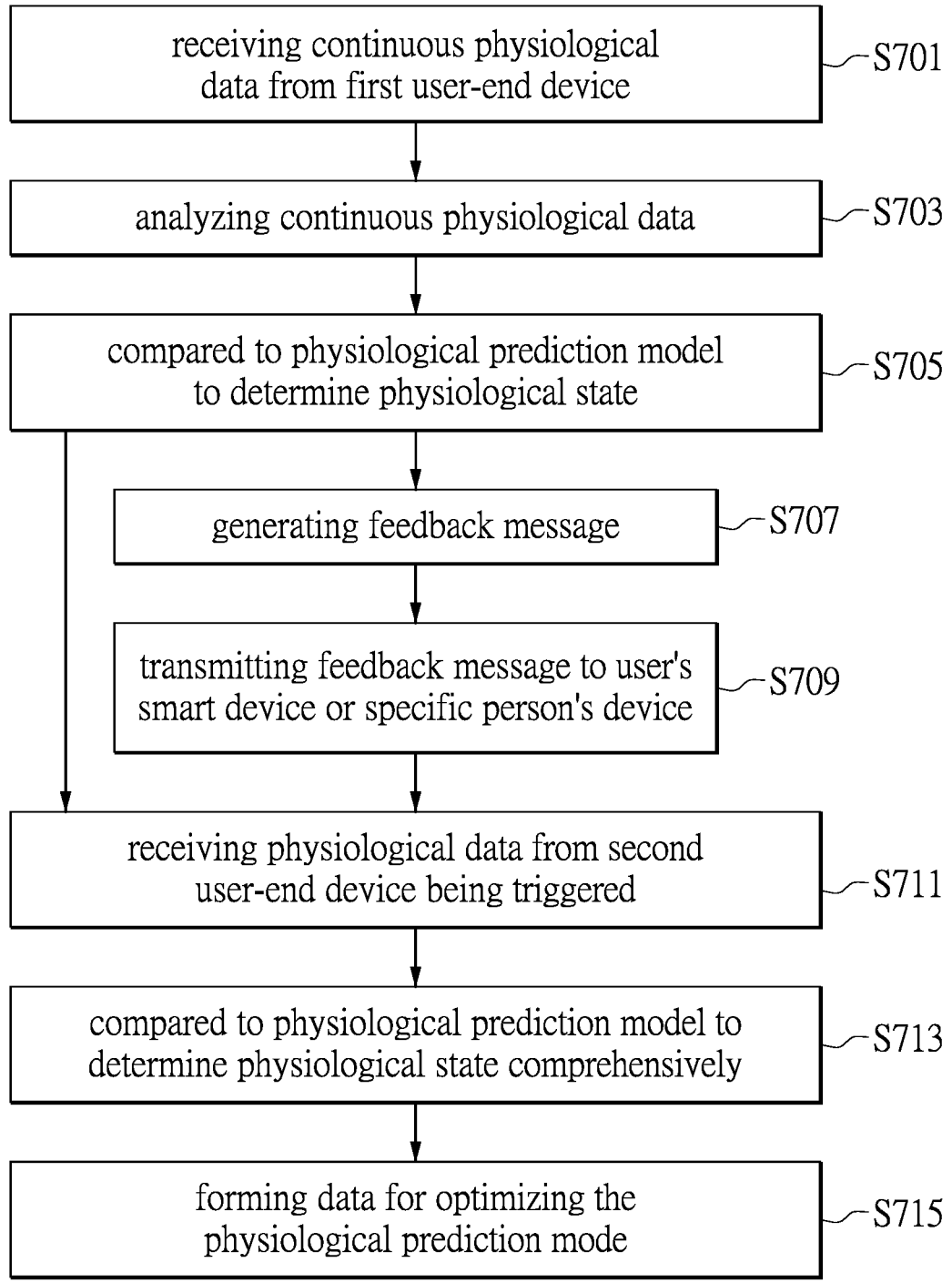
FIG. 7 is a flowchart describing the intelligent method in one embodiment of the present disclosure.

Reference is made to FIG. 7, which is a flowchart describing the intelligent method for processing the physiological data according to one embodiment of the present disclosure.

In the beginning, the first user-end device worn by a user is configured to sense the user's physiological status, so as to generate physiological data continuously and actively. Such physiological data is classified as the minority of items of physiological data. For example, the smart bracelet can be used to sense pulse, heart rate, breathing, movement and/or sleep state based on its functions and its precision. The continuously-sensed data forms the continuous physiological data. As shown in step S701, the physiological data is transmitted to the cloud system via the communication function of the user-end device or another network device.

Next, such as in step S703, a software method in the cloud system analyzes the continuous physiological data. In step S705, as compared with the physiological prediction model established by the machine-learning method in the cloud system, a physiological state can be determined. The means for analysis can be implemented by an artificial intelligence technology that is configured to rely on the continuous physiological data transmitted from the user-end device to determine one of the physiological states according to the physiological prediction model corresponding to the various physiological states.

In step S707, the software method in the cloud system generates a feedback message according to the physiological state, and in step S709, the feedback message can be transmitted to the user's personal smart device or a device of a specific contact person via a network according to identification and communication information corresponding to the user-end device.

In step S705, when the cloud system determines the physiological state, in addition to generating the feedback message (step S707), the user may also receive another message provided by the cloud system. Further, such as in step S711, the system incorporates a prediction mode, in which the second user-end device can be activated to provide the physiological data being collected for a period of time, e.g., the data collected in a previous minute or in previous ten minutes, according to a setting made by a terminal device or by a manual operation. Alternatively, the system can also require the physiological data retrieved from the second user-end device for a past period of time. Rather than the physiological data generated by the first user-end device, the physiological data generated by the second user-end device is classified to non-continuous physiological data. While the non-continuous physiological data is transmitted to the cloud system, such as in step S713, the software method in the cloud system comprehensively determines the physiological state as compared with a physiological prediction model under a learning mode. The related message is fed back to the user. In step S715, the above-mentioned physiological data generated before and after can be compared, so as to form the data for optimizing the physiological prediction model in a machine-learning procedure.

Figure 8:
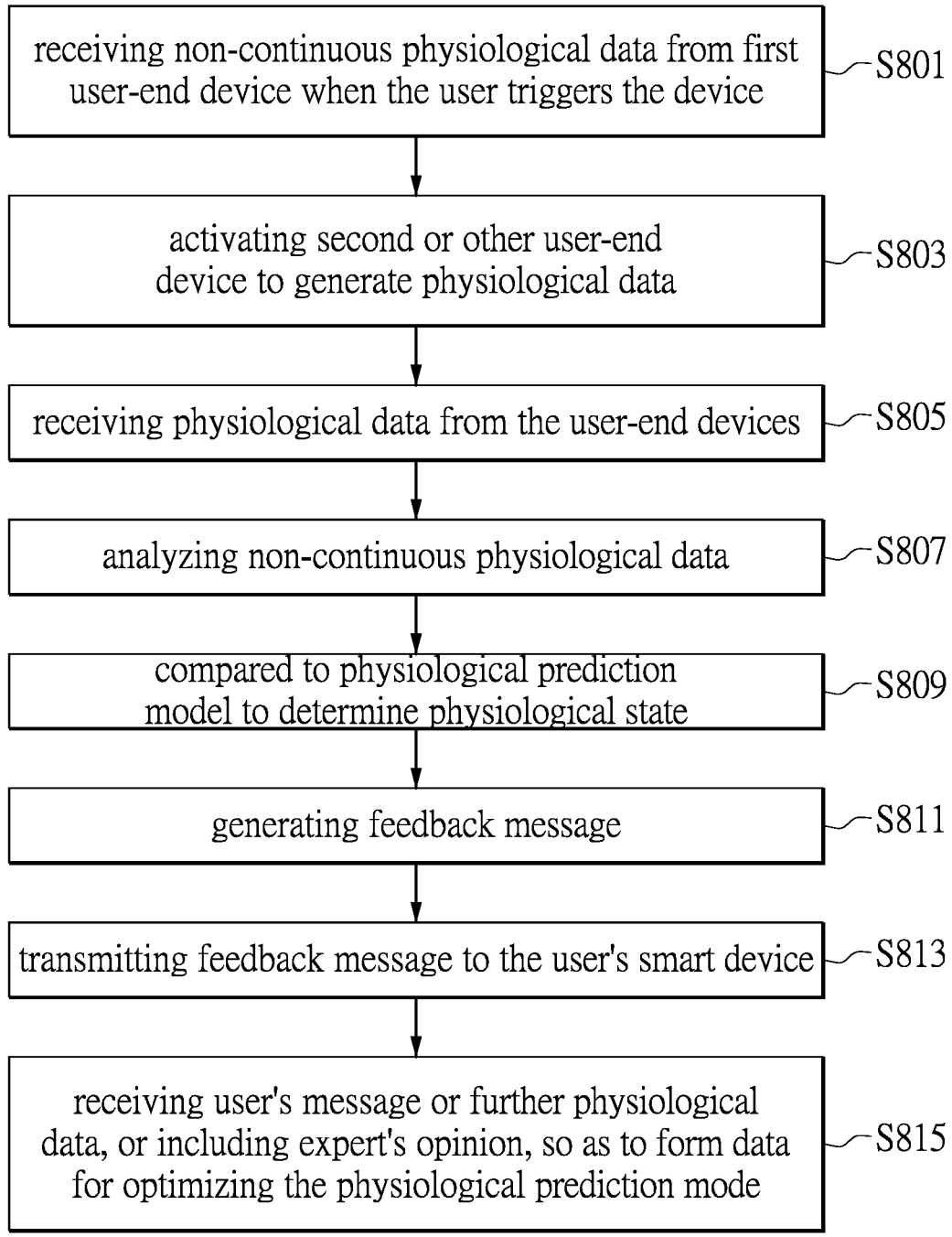
FIG. 8 is a flowchart describing the intelligent method in another embodiment of the present disclosure.

FIG. 8 is another flowchart describing the intelligent method for processing physiological data according to another embodiment of the present disclosure.

In the present example, the first, second or other user-end devices can transmit the physiological data to the cloud system discontinuously. The physiological data can also be generated intermittently and temporarily stored into a memory of the user-end device. At a moment, such as in step S801, the user can be required to or activate the first user-end device by himself to generate the physiological data. For example, the user can activate the user-end device by himself when feeling uncomfortable. The physiological data generated by the first user-end device is classified as non-continuous physiological data. The user-end device can continuously form the non-continuous physiological data to be transmitted to the cloud system by sensing physiological data of a minority of items generated for a period of time.

In the meantime, such as in step S803, the second or other user-end devices can be activated simultaneously for generating further physiological data according to a setting made by the user. It should be noted that the physiological data may be generated in real time or stored in the user-end device for a past period of time. The physiological data is then transmitted to the cloud system. In step S805, the cloud system receives the physiological data generated by every user-end device.

Further, the first, second or other user-end device can be set to be operated cooperatively via a specific device, e.g., the user's computer device. Once any of the user-end devices is activated, other devices can also be activated at the same time based on the setting made by the user. The physiological data generated for the same period of time can also be transmitted to the cloud system together. In the cloud system, the physiological data correlating to a same event can be labeled in the database.

When the cloud system receives the non-continuous physiological data, in step S807, a software method is used to analyze the physiological data. In step S809, a physiological state can be determined as compared with the physiological prediction model established through a machine-learning method in the cloud system. Next, such as in step S811, the cloud system generates a feedback message with respect to the non-continuous physiological data. In step S813, the feedback message is sent to a personal smart device according to the identification and communication information extracted from the user-end device.

When the user receives the feedback message from the cloud system by his smart device, the user can respond to the feedback message. For example, such as in step S815, the user can respond his current physical condition to the cloud system. The user can provide further physiological data to the cloud system. Alternatively, the user can report an expert's opinion to the cloud system when the user goes to a medical institution for further diagnosis. These responses in the cloud system can be labeled in order to indicate the correlations that may reveal some meaningful information among the responses. The messages sent from the user, the physiological data, and/or the expert's opinion is used to be the data for optimizing the physiological prediction mode.

In the flow chart described in FIG. 8, the non-continuous physiological data can be generated by the above-mentioned first, second or other user-end devices. The physiological data generally includes a minority of items but critical information. The labeled physiological data can be used to create a correlation between the non-continuous and continuous physiological data that can be referred to when optimizing the physiological prediction model.

Figure 9:
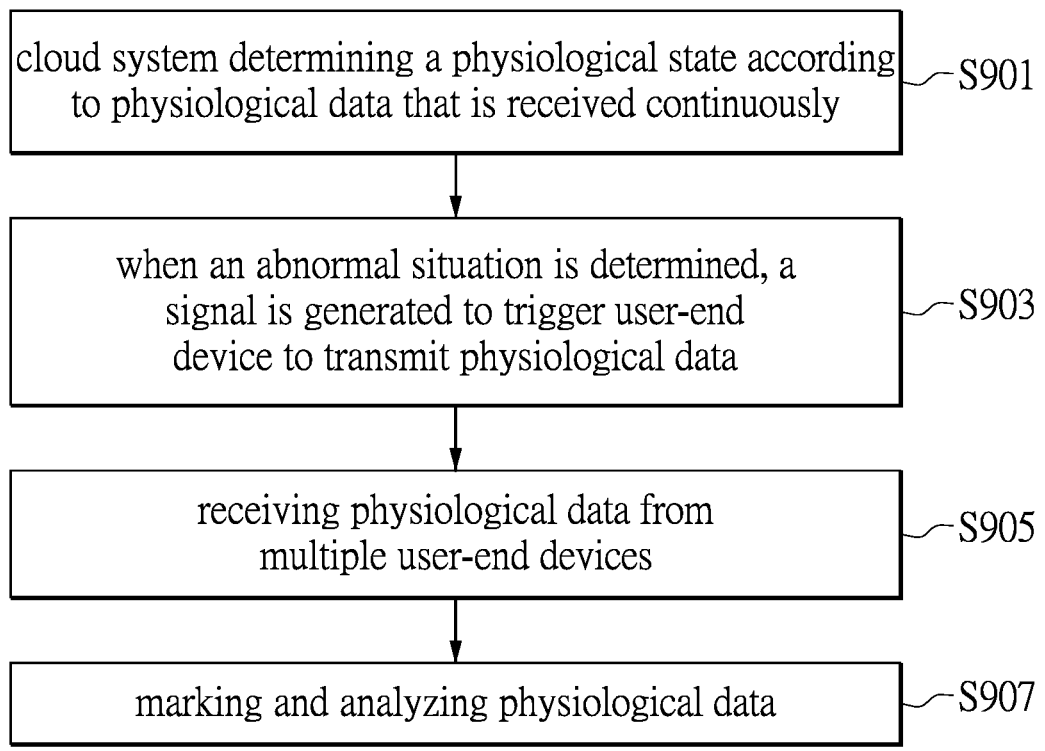
FIG. 9 is a flowchart describing the intelligent method in yet another embodiment of the present disclosure.

FIG. 9 is another flowchart describing the intelligent method for processing the physiological data according to another embodiment of the present disclosure. In addition to actively activating any of the user-end devices by the user for transmitting the physiological data, the cloud system can also activate the user-end device to generate the physiological data that is configured to be provided to the cloud system.

In step S901, the cloud system relies on the physiological data that is continuously generated to determine a physiological state as compared with a physiological prediction model. In step S903, if the cloud system determines any abnormal event, an activation signal is generated for activating any of the user-end devices, and then activating other user-end devices cooperatively. Alternatively, the cloud system can transmit the activation signal via a user-end computer device, e.g., a mobile device, for cooperatively activating the first, second or other user-end devices, so as to transmit the physiological data which is generated in a real time or temporarily stored in the user-end devices for a past period of time. In step S905, the cloud system receives the physiological data that is transmitted from one or more user-end devices, and accordingly labels the physiological data. In step S907, the labeled data in the cloud system reveals that there is a correlation among the data. The data can be used to optimize the physiological prediction model generated through a machine-learning method in the cloud system.

The following are examples showing circumstances that are applied with the intelligent method and system for processing the physiological data. One of the examples is that a working person wears a user-end device that is able to connect to a health cloud. For example, a bus driver wears the user-end device that is configured to generate the physiological data that is provided as a part of big data in the cloud system for implementing a health cloud. The big data, including a personal historical physiological data of the driver, is processed by the machine-learning-based artificial intelligence technology in the cloud system. Here, the examples should not be construed to limit the implementation of the intelligent method and system for processing physiological data provided in the present disclosure.

Scenario One:

If the bus driver notices any abnormality of his body when he is at work, the bus driver uses a first user-end device, e.g., a smart bracelet, to generate a signal via an activation interface of the first user-end device. The activation interface is, for example, a button disposed on the bracelet. The physiological data stored in the bracelet for a period of time (e.g., 30 seconds) can be transmitted to the cloud system by a communication circuit of the bracelet. The bus driver can continue with his work. The cloud system labels the physiological data generated by the first user-end device. The labeled physiological data is analyzed by the artificial intelligence technology in the cloud system. At this moment, an urgent threat may be determined based on the physiological state of the bus driver, and a message is immediately transmitted to the bus driver via the personal smart device that is connected with the cloud system or to a relevant supervisor for help.

Scenario Two:

If the bus driver suffers any abnormality when he is at work, the first user-end device worn by the user labels the physiological data generated immediately and transmits the labeled physiological data to the cloud system for further analysis. When a procedure operated in the cloud system determines that there is no immediate risk, the bus driver is notified through his communication device (e.g., a smart phone) for requiring the driver to watch out for any change in health, asking the driver to go to a hospital for further evaluation, and informing his supervisor for follow-up care. At the same time, the cloud system can continue recording the relevant information which includes subsequent treatment results and a comparison.

Scenario Three:

While the bus driver does not feel any discomfort when he is at work, the cloud system determines that the heart of the bus driver suffers ischemic changes by analyzing heart rate information extracted from the physiological data uploaded from a second user-end device (e.g., smart clothes) worn by the bus driver. It should be noted that the second user-end device is driven to generate the physiological data through a communication technology activated by the cloud system. In the meantime, the cloud system informs the supervisor of the bus driver for any follow-up help via a communication method. For example, the supervisor can order to change the driver and deliver the bus driver to a hospital urgently.

Scenario Four:

The bus driver wears the first user-end device (e.g., a smart bracelet) but does not wear the second user-end device (e.g., smart clothes). The bus driver does not feel any discomfort when he is at work. The cloud system continuously receives the physiological data generated by the first user-end device. After an analysis process, the procedure operated in the cloud system determines that the bus driver is suspected to have an acute ischemic heart disease at a specific moment, and automatically notifies the bus driver to pull over the bus immediately through a communication method. The supervisor is also informed for dispatching another driver to take over the driving and arranging an emergency medical treatment for the bus driver. Further, an ambulance staff of a hospital can also be informed to provide an emergency care at the same time. If the bus driver is identified to have an acute myocardial infarction by an emergency treatment, a heart stent can be implanted urgently. After recuperation, the bus driver can continue the driving work.

Scenario Five:

When the bus driver is ready for work, the bus driver can have a preliminary test by using the first user-end device (e.g., the smart bracelet). For example, the physiological data collected for a period of time is uploaded to the cloud system when a button of the smart bracelet for confirming the status is pressed. A message sent from the cloud system via a communication method indicates that the bus driver had an abnormal sleep status last night, which leads to disorders of the autonomic nervous system and ineffective consciousness. The message even indicates that the bus driver is suspected to have fainted five hours ago. Accordingly, the cloud system suggests that the bus driver should ask for a leave from work, take a rest, and only return to work after making sure he is healthy.

In summation, the intelligent method and system for processing physiological data embodies a health cloud through a cloud system. The cloud system establishes a database by collecting personalized or non-personalized physiological data from various medical information sources, and continuous or non-continuous physiological data that may be a minority from various user-end devices. A big data analysis and a machine-learning method are introduced to establish a physiological prediction model that can be optimized based on new data and a feedback message. Therefore, the system can rely on a minority of items in the physiological data to predict a physiological state of a user. The system can be specified to users of a specific ethnic group and provide a prediction model that provides an accurate and effective prediction based on the users' environment and work background.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An intelligent system for processing physiological data, the intelligent system comprising:
   at least two user-end sensors including a full-time-activated user-end sensor that is used to continuously generate continuous physiological data to be transmitted to a cloud system and an event-activated user-end sensor that is activated in response to a feedback message for generating non-continuous physiological data to be transmitted to the cloud system instantly or for a period of time;
   a button acting as an activation interface being disposed on the full-time-activated user-end sensor; and
   a database implemented by a storage device, used to store personalized physiological data generated by the at least two user-end sensors that are configured to sense physiological status of a user, so as to form a big data;

wherein the intelligent system performs an intelligent method for processing physiological data comprising operations of:
receiving the continuous physiological data and the non-continuous physiological data transmitted from the at least two user-end sensors, wherein the non-continuous physiological data is generated by the event-activated user-end sensor which is activated by the user and/or by the cloud system; wherein the continuous physiological data includes the physiological data that full-time-activated user-end sensor continuously or periodically uploads to the cloud system and the continuous and non-continuous physiological data form a part of the big data stored in the database;
analyzing the continuous physiological data and the non-continuous physiological data transmitted from the at least two user-end sensors and comparing with a physiological prediction model established by a machine-learning method in the cloud system for predicting various physiological states;
generating the feedback message with respect to the continuous physiological data or the non-continuous physiological data according to the physiological state obtained by analyzing the continuous or non-continuous physiological data transmitted from the at least two user-end sensors; and
transmitting, via a communication network, the feedback message to a communication device of the user according to identification and communication information of each of the at least two user-end sensors, and the cloud system is able to optimize the physiological prediction model when the user responds to the feedback message;
wherein, when the activation interface is triggered to generate an activation signal, the event-activated user-end sensor is activated for sensing the physiological data with a minority of items for a period of time that forms the non-continuous physiological data transmitted to the cloud system, and the physiological data generated by the event-activated user-end sensor is transmitted to the cloud system and is labeled for establishing a correlation between the continuous physiological data that is generated by the full-time-activated user-end sensor and the non-continuous physiological data relating to the feedback message.

2. The intelligent system according to claim 1, wherein the full-time-activated user-end sensor or the event-activated user-end sensor is a smart bracelet, a smart necklace, smart clothes, or a fixed physiological sensing sensor worn by the user.

3. The intelligent system according to claim 1, wherein the means for machine-learning method utilizes the big data collected in the database to establish and train the physiological prediction model used to predict various physiological states, and the physiological prediction model is optimized by referring to the physiological state of the user corresponding to each piece of the non-continuous physiological data.

4. The intelligent system according to claim 3, wherein the operation of analysis is an artificial intelligence that is used to determine one of the physiological states according to various preset physiological states of the physiological prediction model based on the continuous physiological data or the non-continuous physiological data transmitted by the at least two user-end sensors.

5. An intelligent method for processing physiological data, which is performed in a cloud system that operates an intelligent system comprising at least two user-end sensors including a full-time-activated user-end sensor and an event-activated user-end sensor, an activation interface being disposed on the full-time-activated user-end sensor and a storage-device-implemented database used to store personalized physiological data generated by the at least two user-end sensors which are configured to sense physiological status of a user, wherein the intelligent method comprises:
receiving continuous physiological data and non-continuous physiological data from the at least two user-end sensors having the full-time-activated user-end sensor and the event-activated user-end sensor worn by the user, wherein the continuous physiological data includes the physiological data that full-time-activated user-end sensor continuously or periodically uploads to the cloud system;
analyzing the continuous physiological data or the non-continuous physiological data, and comparing with a physiological prediction model established by a machine-learning method in the cloud system, so as to determine a physiological state;
generating a feedback message with respect to the continuous physiological data or the non-continuous physiological data in response to the physiological state; and
transmitting, via a communication network, the feedback message to a communication device of the user according to identification and communication information corresponding of each of the at least two user-end sensors, and the cloud system is able to optimize the physiological prediction model when the user responds to the feedback message;
wherein the personalized physiological data includes the continuous physiological data and the non-continuous physiological data that form a big data; and the big data stored in the database is then analyzed by the machine-learning method, so as to establish the physiological prediction model used to predict the physiological state;
wherein, when the activation interface is triggered to generate an activation signal, both the full-time-activated user-end sensor and the event-activated user-end sensor are cooperatively activated; wherein, when the activation signal is generated via the activation interface, the event-activated user-end sensor is configured to sense the physiological data with a minority of items for a period of time that forms the non-continuous physiological data transmitted to the cloud system, and the physiological data generated by the event-activated user-end sensor is transmitted to the cloud system and is labeled for establishing a correlation between the continuous physiological data that is generated by the full-time-activated user-end sensor and the non-continuous physiological data relating to the feedback message.

6. The intelligent method according to claim 5, wherein the event-activated user-end sensors is activated if the cloud system determines an abnormality based on the continuous physiological data, the full-time-activated user-end sensor is activated cooperatively, and the physiological data generated by both the full-time-activated user-end sensor and the event-activated user-end sensor for the period of time is transmitted to the cloud system.

7. The intelligent method according to claim 5, wherein the big data collected in the database is utilized by the machine-learning method to establish and train the physiological prediction model used to predict various physiological states, and the user's state corresponding to each piece of the non-continuous physiological data is referred to for optimizing the physiological prediction model; wherein the means for analysis is an artificial intelligence that is used to determine one of the physiological states according to various preset physiological states of the physiological prediction model based on the continuous physiological data or the non-continuous physiological data transmitted by any of the full-time-activated user-end sensor and the event-activated user-end sensor.

8. An intelligent system for processing physiological data, the intelligent system comprising:
   at least two user-end sensors including a full-time-activated user-end sensor that is a wearable sensor worn on a care recipient and is used to continuously generate continuous physiological data to be transmitted to a cloud system in a full-time operation, and an event-activated user-end sensor that is disposed around the care recipient and is activated in response to a feedback message for generating non-continuous physiological data to be transmitted to the cloud system instantly or for a period of time;
   a button acting as an activation interface being disposed on the full-time-activated user-end sensor; and
   a database implemented by a storage device, used to store personalized physiological data generated by the at least two user-end sensors that are configured to sense physiological status of a user, so as to form a big data;
   wherein the intelligent system performs an intelligent method for processing physiological data comprising operations of:
      receiving the continuous physiological data and the non-continuous physiological data transmitted from the at least two user-end sensors, wherein the non-continuous physiological data is generated by the event-activated user-end sensor which is activated by the user and/or by the cloud system; wherein the continuous physiological data includes the physiological data that full-time-activated user-end sensor continuously or periodically uploads to the cloud system and the continuous and non-continuous physiological data form a part of the big data stored in the database;
      analyzing the continuous physiological data and the non-continuous physiological data transmitted from the at least two user-end sensors and comparing with a physiological prediction model established by a machine-learning method in the cloud system for predicting various physiological states;
      generating the feedback message with respect to the continuous physiological data or the non-continuous physiological data according to the physiological state obtained by analyzing the continuous or non-continuous physiological data transmitted from the at least two user-end sensors; and
      transmitting, via a communication network, the feedback message to a communication device of the user according to identification and communication information of each of the at least two user-end sensors, and the cloud system is able to optimize the physiological prediction model when the user responds to the feedback message;
   wherein, when the activation interface is triggered to generate an activation signal, the event-activated user-end sensor is activated for sensing the physiological data with a minority of items for a period of time that forms the non-continuous physiological data transmitted to the cloud system, and the physiological data generated by the event-activated user-end sensor is transmitted to the cloud system and is labeled for establishing a correlation between the continuous physiological data that is generated by the full-time-activated user-end sensor and the non-continuous physiological data relating to the feedback message.

* * * * *